Dec. 17, 1929.  R. CHILTON  1,739,947

CLUTCH

Filed Feb. 29, 1928

INVENTOR
ROLAND CHILTON:
BY
ATTORNEY

Patented Dec. 17, 1929

1,739,947

UNITED STATES PATENT OFFICE

ROLAND CHILTON, OF KEYPORT, NEW JERSEY, ASSIGNOR, BY MESNE ASSIGNMENTS, TO ECLIPSE MACHINE COMPANY, OF ELMIRA HEIGHTS, NEW YORK, A CORPORATION OF NEW YORK

CLUTCH

Application filed February 29, 1928. Serial No. 258,076.

This invention relates to load limiting friction clutches and provides means whereby a clutch may be organized for any desired difference between the slipping load in the forward and reverse directions of rotation or driving effort.

The clutch of this invention is useful for example, whenever there is reverse torque between a pair of members and it is desired to fix a different limit to the torque transmitted according to which of the members is driving the other.

An object of the invention is to provide a load limiting clutch that is responsive to a lesser driving force in either one of two driving directions.

The preferred form as herein disclosed for achieving this action, constitutes an improvement over the structure shown in my Patent No. 1,632,539 which discloses a load limiting friction clutch having means whereby the drive load re-acts in opposition to a preset friction pressure spring to release the clutch at a certain load. Other forms of load limiting friction clutches are known in the art and the use of any form of load limiting clutch in combination with means as herein disclosed to produce a different torque value for forward and backward slippage is considered as being within the scope of the present invention.

In the patent referred to, the drive is transmitted from the driving member to clutch pressure members through inclined faces which exert a separating tendency on these pressure members bearing a proportion to the driving load depending upon the degree of inclination of the driving faces. The clutches shown in the patent, have double opposed inclined faces adapted to release the clutch in either direction of rotation at the same load in virtue of the equal inclinations of the forwardly and backwardly acting incline. The principal feature of the present invention resides in so organizing the load relieving driving surfaces that those in action during forward driving have a different inclination and, therefore, impose a different degree of separating tendency to those engaged during reverse driving action. It will be seen that if the slope of one set of faces be made extremely slight, a relatively great separating re-action will be produced from a relatively small driving load whereby the clutch may be organized for slippage in one direction under extremely low torque and will comprise a one-way clutch having a slight frictional drag against overrun.

In the preferred showing of the drawings anti-friction members comprising balls are interposed between the inclined actuating faces. Inclined faces are shown as the preferred mechanical device by which different de-clutching re-actions may be derived from the driving load in forward and reverse directions but the use of the known devices to produce the same result is considered within the scope of the present invention.

It will be noted that the drive load may vary either by reversal of the direction of rotation while one member remains the driver, or by the over-run of the normally driving member by the normally driven member without change in the direction of rotation.

Figure 2:
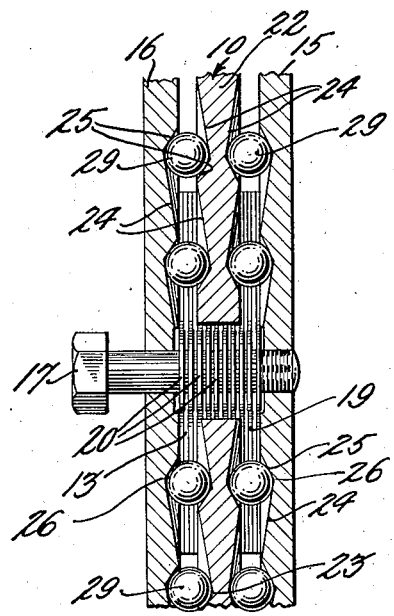
Figure 2 is a circumferential section taken on the line 2—2 of Fig. 1 as looking in the direction indicated by the arrows.
Figure 1:
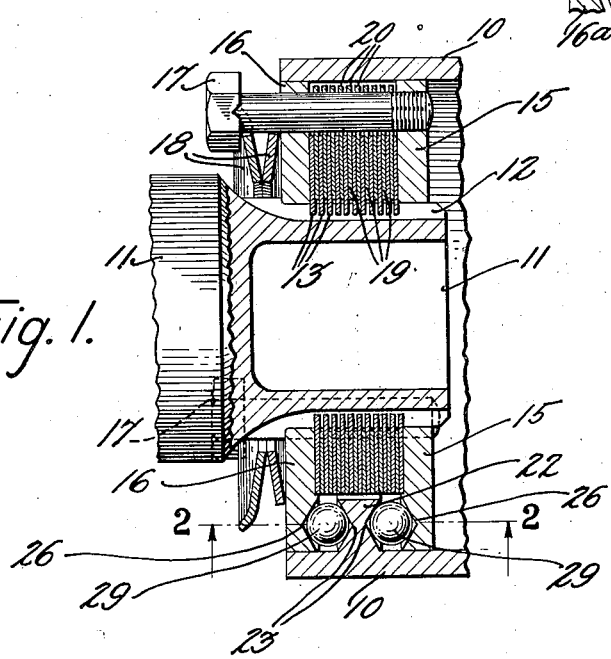
Figure 1 is a longitudinal section of the present invention.

In the present instance with reference to Figs. 1 and 2 of the drawings, 10 designates the clutch driving member and 11 the driven member. To the member 11 there are connected by means of the splines 12 a plurality of friction disks 13 and rotatably mounted upon this member are the end plates 15 and 16 which are adapted to move relatively to the clutch driving member 10.

The end plates 15, 16 are drawn together by the bolts 17 and the dished springs 18, the springs being settable by said bolts to any desired degree of pressure, and a further series of disks 19 which alternate with the disks 13, are connected to the bolts 17 by means of the radially extended ears 20.

Formed integrally with the clutch driving member 10, is an annular portion 22 in which there is formed in circumferentially spaced relation, a plurality of pockets 23 having inclined faces 24 and 25 of substantially different degree of angularity and similar pockets 26 are formed on the inner sides of each of the end plates 15, 16. The relative depth of the pockets 23, 26 should be such as to permit a ball 29 being retained therein without offering any restraint to the friction producing pressure of the end plates 15, 16 upon the disks 13, 19, when the clutch is free from driving load, and the end plates 15, 16 should be mounted so as to permit them to have a certain limited rotational movement within the clutch member 10.

In operation of the clutch under normal load, the disks 13, 19 are held in frictional engagement with one another by the pressure of the springs 18. The balls 29 transmit motion from the clutch driving member 10 to the end plates 15 and 16 by means of the recesses or inclined pockets 23, 26 and to the disks 19 by means of the bolts 17. The disks 19 transmit drive in turn to the disks 13 which are splined to the driven clutch member 11, said member 11 being connected in any suitable manner to a means to be driven.

It will be understood that as this driving action takes place, the balls 29 incidentally tend to separate the end plates in opposition to the spring pressure which has been set to resist a certain predetermined load or driving effort, and it will be further understood that if the inclination of the driving faces has greater angularity as at 25, the spring can resist a greater driving load in that direction than when the direction of rotation of the driving member is reversed and the balls are caused to act against the driving faces 24 which have a substantially lesser degree of angularity. Therefore, any desired difference between the slipping load in a forward and reverse direction of rotation can be accomplished by variations in the angularity of the driving faces 24, 25.

Figure 3:
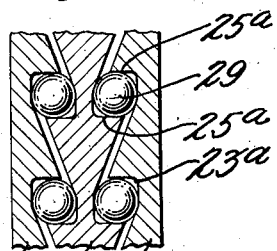
Figure 3 is a fragmentary sectional view similar to Fig. 2, and illustrates an alternative structure.

With reference to Fig. 3, there is shown an alternative structure in which the pockets 23ª are so formed in the elements 10ª, 15ª and 16ª that there is no tendency to cause separation of the elements 15ª and 16ª when the clutch is operated in a forward driving direction against the abutments 25ª but slipping action will occur at any desired load when operated in a reverse direction.

Variations may be resorted to within the scope of the invention and portion of the improvements may be used without the others, whilst not departing from the spirit of the invention.

Having thus described my invention, I claim:

1. In a clutch adapted to drive in either direction of rotation, the combination of a driving means, a pair of axially separable driving clutch members, driven means frictionally engaged thereby, spring means normally effecting said engagement, and torque responsive drive transmitting means connecting each clutch member to the driving means and adapted to relieve said frictional engagement at a lesser torque in one direction of rotation than in the other.

2. A friction clutch comprising in combination, an axially floating assemblage of clutch members including end members having opposed inclined driving faces, a driving member having similar inclined faces, spring means adapted to press all of said members together, and drive transmitting means acting against said faces and tending to separate the clutch members under a driving load, said driving faces having a different degree of inclination in one direction of drive than in the other.

3. In a load limiting device, the combination of, a pair of friction pressure plates, friction drive means therebetween, spring means preset to normally impose a much greater pressure than appropriate to the desired slipping load, angular driving faces on each of said pressure plates effective in either direction of rotation, said faces having a different degree of angularity in one direction of drive than in the other, and rolling drive means between said plates and engaging said faces and adapted to impose a greater separating tendency on the plates in one direction of rotation than in the other.

Signed at Keyport, in the county of Monmouth, and State of New Jersey this 27th day of February, 1928.

ROLAND CHILTON.